US006012484A

United States Patent [19]
Bosanquet

[11] Patent Number: 6,012,484
[45] Date of Patent: Jan. 11, 2000

[54] VALVE ASSEMBLY

[76] Inventor: John Bosanquet, 142 Central Avenue, Oak Flats, New South Wales 2529, Australia

[21] Appl. No.: 08/853,829

[22] Filed: May 9, 1997

[30] Foreign Application Priority Data

May 13, 1996 [AU] Australia .................................. PN9823

[51] Int. Cl.[7] .................................................. F16K 37/00
[52] U.S. Cl. ........................... 137/554; 137/552; 137/559
[58] Field of Search ..................... 137/553, 554, 137/559, 552

[56] References Cited

U.S. PATENT DOCUMENTS

| | | | |
|---|---|---|---|
| 1,517,990 | 12/1924 | Hinkle | 137/552 |
| 2,328,029 | 8/1943 | Porter | 137/552 |
| 4,090,467 | 5/1978 | Joesting | 137/552 |
| 5,427,140 | 6/1995 | Bosanquet . | |

Primary Examiner—A. Michael Chambers
Attorney, Agent, or Firm—Laff, Whitesel & Saret, Ltd.; J. Warren Whitesel

[57] ABSTRACT

A valve assembly includes a base (10), a handle (18) and a spindle (14) connected to the handle (18) at one end and adapted at the opposite end for opening and closing the valve. The spindle (14) extends from the base (10) to the handle (18) and is adapted such that rotation thereof results in opening and closing of the valve respectively. The base (10) is provided with two or more first indication means (R,B,G) and the handle is provided with two or more second indication means (20,21,22;RR,BB,GG). At least one of the indication means on either or both of the base (10) and handle (18) is independently positionable on the base (10) or handle (18) relative to the other indication means and is alignable with a corresponding indication means on the handle or base respectively such that two or more respective predetermined degrees of rotation of the handle can be recorded.

6 Claims, 4 Drawing Sheets

VALVE ASSEMBLY

FIELD OF THE INVENTION

The present invention relates to a valve assembly, for example, a basic tap valve assembly but which has been modified such that predetermined tap rotational positions can be recorded by a number of different users of the valve assembly. The invention will be primarily described with reference to its use in domestic (eg. shower and bath) applications although it should be appreciated that the invention is not so limited, and can find application in commercial and industrial environments also.

BACKGROUND ART

Valve assemblies are known that include modifications such that a predetermined tap rotational orientation can be recorded and that position can then be repeatedly selected by a user. U.S. Pat. No. 5,427,140 to the present applicant, John Bosanquet, describes such an assembly that makes use of both a mechanical recordal of position as well as a light-registering type position recordal configuration. However, the configurations of the prior art do not adequately address multiple user situations, nor do they take into account changes in supply fluid parameters (eg. variations in municipal water supply temperatures, flow rates etc).

SUMMARY OF THE INVENTION

The present invention provides a valve assembly including a base, a handle and a spindle connected to the handle at one end and adapted at the opposite end for opening and closing the valve, the spindle extending from the base to the handle and adapted such that rotation thereof results in opening and closing of the valve respectively, wherein the base is provided with two or more first indication means (FIM) and the handle is provided with two or more second indication means (SIM), with at least one of the indication means on either or both of the base and handle being independently positionable on the base or handle relative to the other indication means and being alignable with a corresponding indication means on the handle or base respectively such that two or more predetermined degrees of rotation of the handle can be recorded.

By providing an arrangement whereby at least one of the indication means on the base or handle is independently positionable, two or more users can select and record optimum valve positions for further use. Alternatively, where different streams flow through the valve assembly and require different valve positions, movement to each position can be readily achieved through the multiple positional recordal configurations provided by the valve assembly. Changes such as fluid supply temperatures, fluid flow rates etc can also be accommodated (as will become apparent from the description below).

Preferably each first indication means is slide mounted and is movable in a track formed in the base, (or alternatively the handle) wherein the track can be common for each first indication means or can be a particular track for that first indication means (ie. whereby a separate track for each other first indication means is provided). In this regard, it is then preferred that each second indication means is fixed in the handle and is positioned therein to be alignable with a respective first indication means. Each first indication means can be a light emitter, (eg. an LED) emitting for example light of distinct frequency(s) or colour(s) and the second indication means may then suitably be light receivers, each corresponding, for example, with a particular distinct frequency or colour. The receivers can be either adapted for re-illumination, and may in this regard be transparent or translucent inserts, optionally having a chemical configuration that is excited by impinging radiation (ie. fluorescence, phosphorescence or luminescence) or may simply be an open passage extending through the handle that may also be configured to change the direction and/or intensity of the light shining therethrough.

In an alternative configuration the first and second indication means can be one or more or mechanical, electromechanical or physical formations, including positionable lugs, markings, positionable lights that align with markings etc.

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Figure 1:
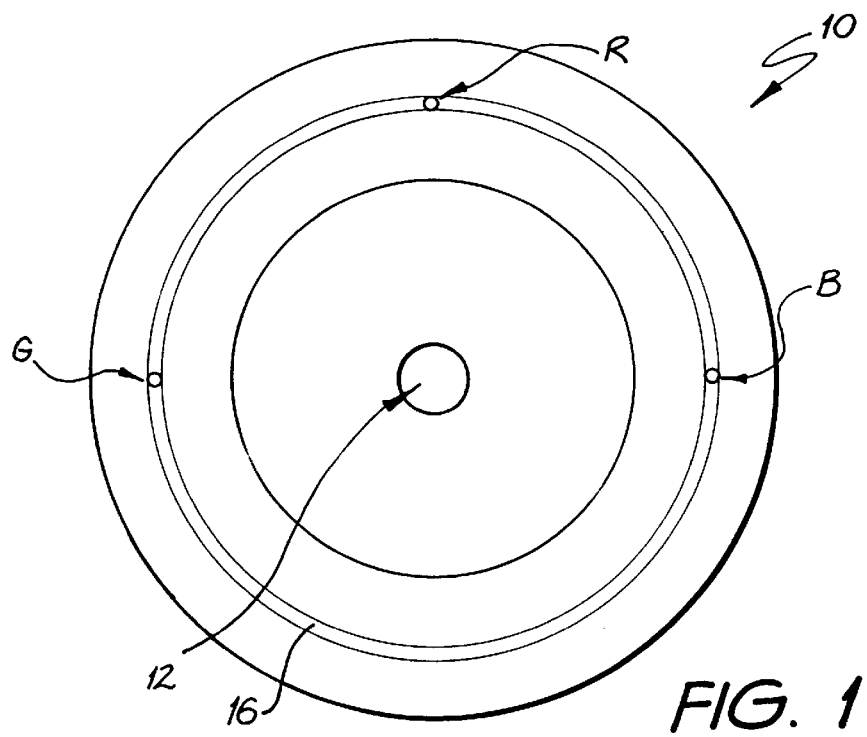
FIGS. 1, 3 and 5 show schematic plan views of three different base plate configurations according to the invention.
Figure 2:
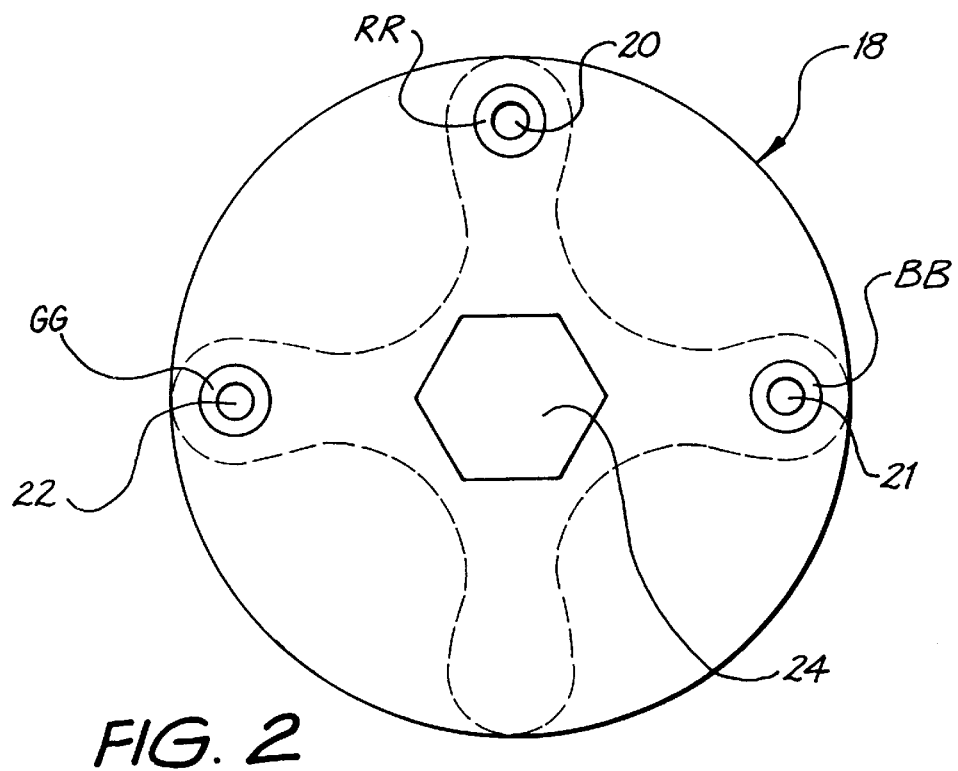
FIGS. 2, 4 and 6 show schematic plan views of three different handle configurations according to the invention.
Figure 7:
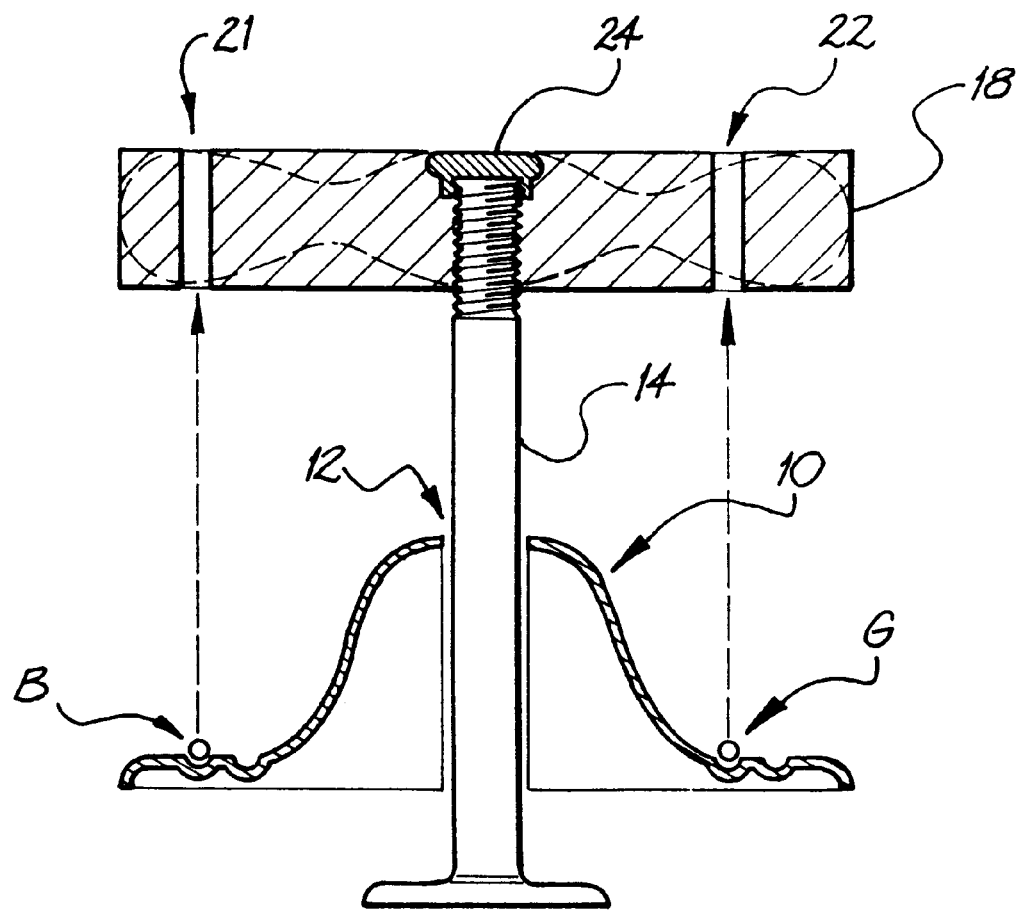
FIG. 7 shows a schematic side sectional elevation of one preferred valve assembly configuration according to the invention.

Referring to FIGS. 1 and 2, a base plate 10 includes an opening 12 for a spindle 14 (only shown in FIG. 7). The base plate is typically mounted to a surface (eg. such as a bath or shower wall) and forms a support for the valve assembly. The base plate in FIG. 1 includes a channel 16 formed therein and three light emitting devices (LED) are positioned and are slidable within the channel 16, namely, red LED R, blue LED B and green LED G. The red, blue and green LED's can be slid around and within channel 16 to any desired position (and can be fastened at that position with any suitable mechanism; eg. as shown in U.S. Pat. No. 5,427,140).

FIG. 2 shows a handle 18 (which may be circular as shown in hard outline in FIG. 2 or of a more conventional shape as shown in dotted outline). First, second and third passages 20, 21 and 22 are formed to extend right through the handle (eg. as shown in FIG. 7). Each passage can incorporate a glass or plastic insert which is adapted for illumination when the passage registers with (ie. is aligned with) a respective LED. For example, the insert in passage 20 can be specifically adapted to illuminate only upon registration with and the receiving of lighting from red LED R (ie. whereby the insert is sensitive only to red visible light). A similar configuration can be adopted with passage 21 and blue LED B and passage 22 and green LED G.

As an alternative, or in addition to insert illumination, the area surrounding each passage can he coloured for ease of identification by a user of the apparatus. For example, the opening at first passage 20 can be surrounded by a red region RR, the opening at passage 21 can be surrounded by a blue region BB and the opening at passage 22 can be surrounded by a green region GG. As a further alternative, the LED's can be mounted and moveable on the handle rather than the base plate, or the inserts or passages may be moveable in the handle and the LED's (or other) fixed in the base plate. In some applications both may be moveable, on both the handle and base plate.

The handle can be attached to the end of the spindle and locked thereto by a locking nut 24. In addition, the handle can be screw threaded to the spindle in a conventional manner as shown in FIG. 7.

In use of the device of FIGS. 1 and 2, three people can select a respective LED to be their positional LED. Thus, one person would take the red LED, one person the blue and one person the green (and for more people, further and different coloured LED's or other types of indication systems, as described below, can be employed).

In the setting up (installation) of the tap valve assembly, a first person can position the base plate so that the red LED is top dead centre. The person then turns the taps to their preferred operating temperature (eg. hot and cold taps in a shower) but with the nut 24 removed. The person then selects the passage 20 in the handle and aligns it with the red LED now located at top dead centre (ie. as in FIG. 2). Any slight adjustment of the handle position for alignment (eg. due to the existence of splines on the spindle 14 not allowing complete alignment between passage 20 and red LED R) can be accommodated by slightly moving LED R, and then fastening the LED in that new position. This new alignment of course is detected by that user's line of sight. The locking nut can then be fastened so that the base plate is fixed in that position. This configuration now provides an initial reference point. The tap is then turned off after use.

The subsequent users then can select another coloured LED and then turn the tap to their preferred positions. After this, they move their respective LED in channel 16 to a position so that the LED) aligns with that user's selected and respective passage. Thus, these users also have predetermined settings and hence when using the tap assembly in the future, all the user simply needs to do is turn the tap until the LED and it's respective passage align and the optimum shower operating temperature, flow rate etc. will be reached.

When the prevailing (ie. ambient) water supply conditions change (eg. due to seasonal water temperature variations, say between summer and winter; or where supply pressures vary etc), and for example, the person using the LED R requires more hot and less cold water (eg. in winter) then that person turns the tap to the new desired position and simply moves their LED's R to then align with their passage 20. This then becomes their new predetermined setting.

Similar adjustments can be made for each other person, so that each person can individually adjust their LED positions to accommodate for the prevailing ambient conditions. Thus, once nut 24 has been fastened in the manner of installation described above, all further adjustments can be made by each user by moving their respective LED's.

As a less desirable, but still feasible alternative, the base plate itself can be slightly rotated (ie. by loosening nut 24 or by using a base plate adjustment mechanism as shown in U.S. Pat. No. 5,427,140) and then every person's position is automatically adjusted to the new ambient conditions.

Whilst this tap assembly obviously has domestic applications, it can also be used in industrial situations where different throughstreams, substances, etc. flowing through the valve assembly require different settings.

It should be noted in FIG. 1 that only one channel 16 is provided. Generally, this will be suitable for many applications, because the different user requirements in tap position with many tap assemblies is unlikely to be more than one-quarter or one-half of a turn. However, in such situations where tap turnings are greater than one-quarter or one-half etc, then the users can select the most suitable LED that will enable the greater or lesser turnings of the tap handle to be accommodated. For example, where clockwise turning opens the tap of FIG. 2, and more than one rotation is required by a user beyond that of the position assumed by LED R, then that user might select the LED G and position that LED G near the bottom of the handle in track 16. These various configurations can, of course, be worked out through simple experimentation.

Figure 3:
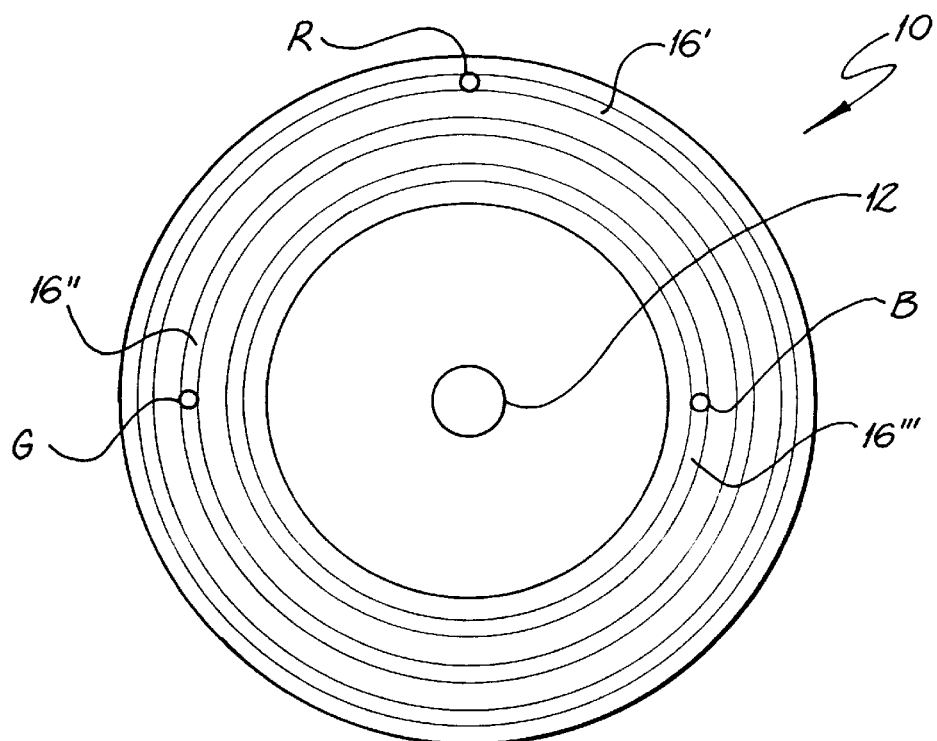
Figure 4:
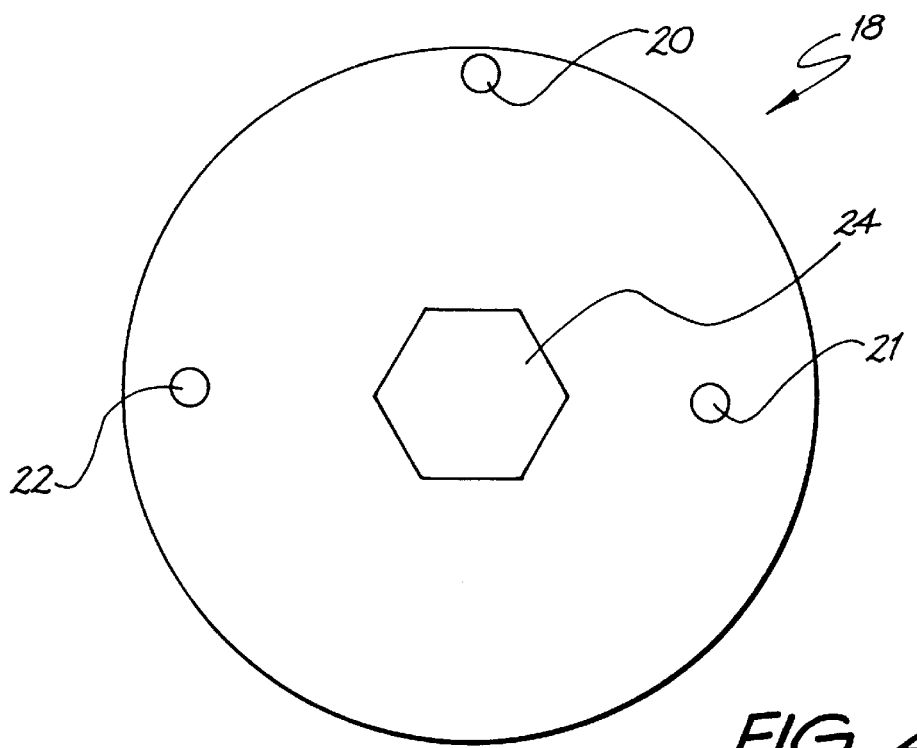

However, to simplify this, -the configuration of FIGS. 3 and 4 can be adopted. In FIG. 3, each LED R, G and B has a respective channel 16', 16" and 16'". Thus any rotational position of the LED can be recorded simply by sliding the LED in its respective channel to the registering position. This latter configuration necessitates the offset of the passages 20, 21 and 22 as shown in FIG. 4. FIG. 7 also shows a configuration where two such channels are employed.

Figure 5:
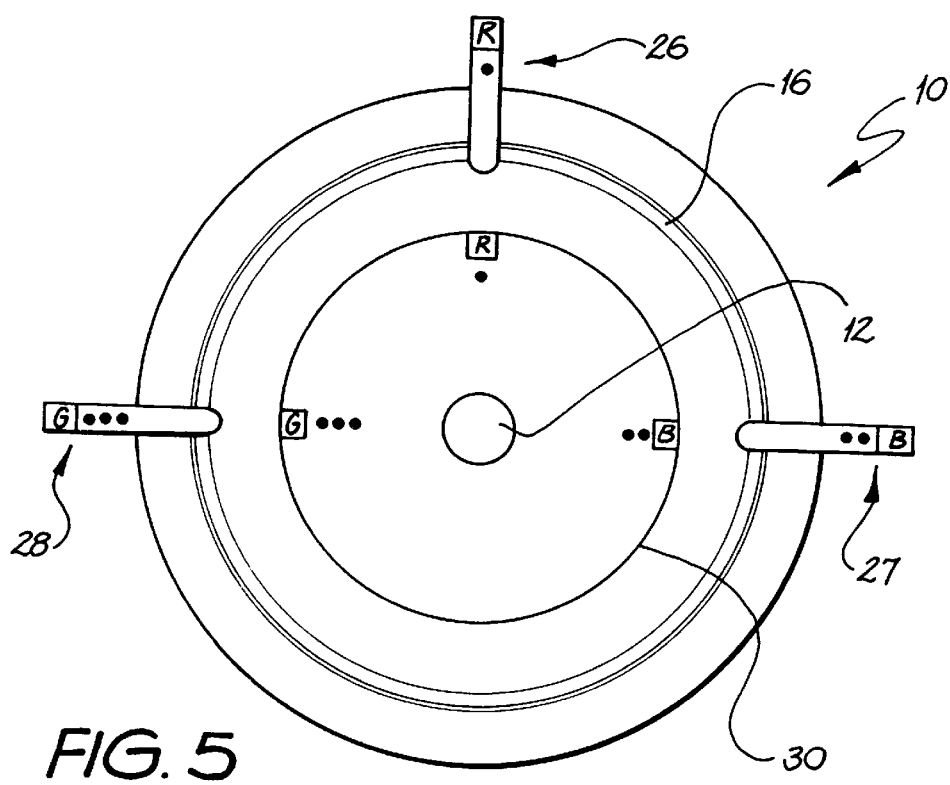
Figure 6:
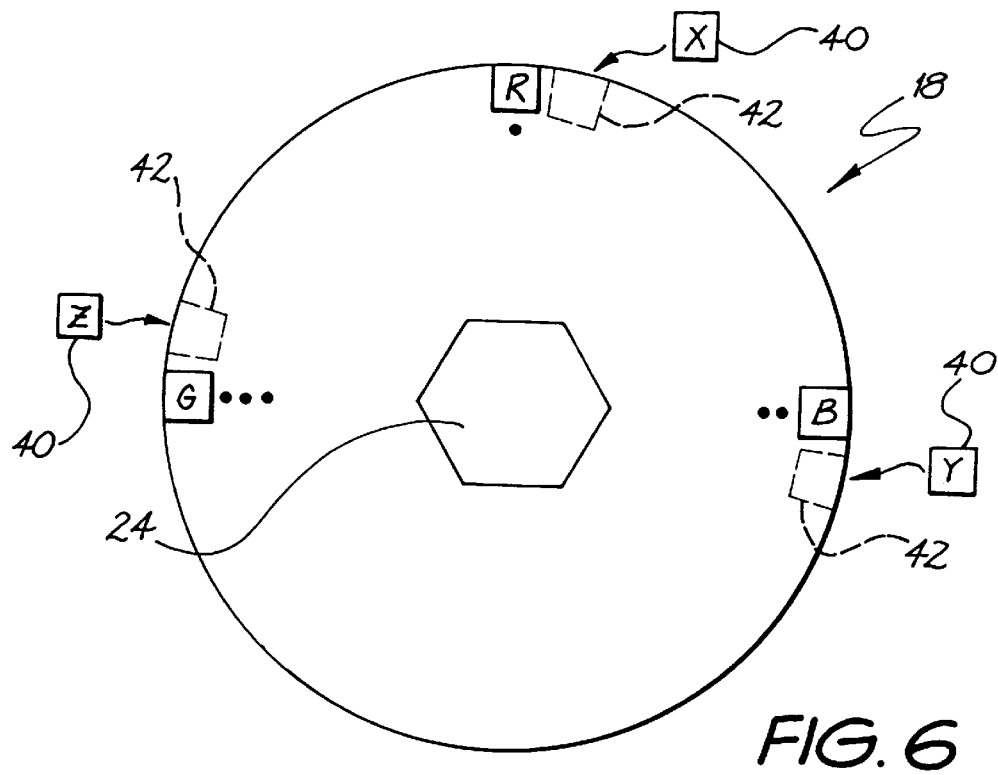

Rather than using LED's, such as miniature light globes, luminescent, fluorescent, phosphorescent materials etc., mechanical and/or physical markings (optionally in conjunction with LED's) can be employed, eg. as shown in FIGS. 5 and 6. In FIG. 5, a first lug 26 is mounted for sliding in channel 16, as are a second lug 27 and third lug 28. The first lug can be provided with a red coloured tip or red LED R or a marking (eg. a single dot) as shown. The second lug can then be provided with a blue coloured tip, blue LED B, or a different marking (eg. two dots) to that of the f irst lug. The third lug 28 can then be provided with a green coloured tip, green LED G, or further and different markings (eg. three dots) to that of the first and second lug. Again, the lugs can be slid to any position as desired by a respective user. The tap handle can then be provided with a corresponding red square or red LED R, or a corresponding marking (eg. one dot) for alignment with the first lug. In addition, a blue square or blue LED, or a corresponding marking (eg. two dots) and a green square or a green LED, or a corresponding marking (eg. three dots) can also be provided on the handle as shown in FIG. 6.

FIG. 6 also shows the use of identifying tabs 40 (eg. rigid plastic tabs), which can each be positioned in a respective slot 42 formed within the handle 18. Each tab can carry the initial of the user to further enhance identification of the user's respective position. When a user changes, a different tab can be positioned in a respective slot.

When the handle diameter is approximately the same size as the base plate diameter (as is often the case), then the protruding lug arrangement as shown in FIG. 5 can be favourably used. This enables each square, LED or marking on the handle to he brought into alignment with a respective lug for easy viewing by a user (ie. with no obscuring by the handle).

However, the base plate can be sized to be larger than the handle, in which case a smaller diameter handle 30 can be provided (which is shown positioned over the base plate at FIG. 5). In this case, there is no need to employ the first, second or third lugs, and configurations similar to that shown in FIGS. 1 and 3 can be employed (ie. with either a single channel 16 or multiple channels 16', 16" etc). Nevrertheless, the basic principle of alignment, whereby each user selects a respective LED, lug, marking etc and then moves that to the optimum tap setting for that user, is essentially the same (ie. whether lights or mechanical, electromechanical or physical markings are employed).

From this, it should be appreciated that many different configurations can be provided which reproduce individual positional selection possibilities.

Whilst a one, two and three dot system has been shown in FIG. 5, any other type of marking arrangement can be used.

For example, coloured regions, eg. as shown with regions RR, BB and GG or as shown in FIG. 5 and 6 can be employed, alpha-numeric coding systems corresponding eg. to a user's initial (or initials) or to some other process stream description can also be used.

The passages need not include inserts and may simply be open holes drilled or formed right through the tap handles. The passages may also taper outwardly from the underside of the handle to the top of the handle, to result in a splaying outwards of the light emitted therefrom. For example, a light refractive effect can be induced.

Whilst the invention has been described with reference to a number of preferred embodiments, it should be appreciated that the invention can be embodied in many other forms.

What is claimed is:

1. A Valve assembly including a base, a handle and a spindle connected to the handle at one end and adapted at the opposite end for opening and closing the valve, the spindle extending from the base to the handle and being adapted such that rotation thereof results in opening and closing of the valve respectively, wherein the base is provided with at least two first positionable indication means (FIM) and the handle is provide with at least two second positionable indication means, (SIM) means for independently positioning at least one of the indication means on either or both of the base and handle relative to the other indication means and being alignable with a corresponding indication means on the handle or base respectively such that two or more respective predetermined degrees of rotation of the handle can be recorded.

2. A valve assembly as claimed in claim 1 wherein each FIM is slide mounted and is movable in a track formed in the base that is:
   (a) common for each FIM; or
   (b) solely for that FIM and separate from each other FIM track.

3. A valve assembly as claimed in claim 2 wherein each SIM is fixed in the handle and is positioned therein to be alienable with a respective FIM.

4. A valve assembly as claimed in claim 1 wherein the FIM are light emitters, with each FTM emitting a distinct frequency/colour; and wherein the SIM are light receivers, with each emitter on the base having a corresponding receiver on the handle, and with each receiver being adapted for re-illumination and/or transmission to a user of the assembly.

5. A valve assembly as claimed in claim 4 wherein the receivers are:
   (a) transparent or translucent inserts extending through the handle;
   (b) open passages extending through the handle; or
   (c) each adapted for focusing and/or directing the light emitted from a respective emitter.

6. A valve assembly as claimed in claim 1 wherein the FIM and SIM are both mechanical, electromechanical or physical formations arranged on the base and handle respectively, with each SIM identifiably corresponding to a particular FIM.

\* \* \* \* \*